US011130398B2

(12) United States Patent
Shamie et al.

(10) Patent No.: US 11,130,398 B2
(45) Date of Patent: Sep. 28, 2021

(54) FRONT-WHEEL DRIVE HYBRIDIZATION

(71) Applicant: Schaeffler Technologies AG & Co. KG, Herzogenaurach (DE)

(72) Inventors: Christopher Shamie, Brighton, MI (US); Patrick Lindemann, Wooster, OH (US); Markus Steinberger, Sagamore Hills, OH (US); Paul Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/884,222

(22) Filed: May 27, 2020

(65) Prior Publication Data
US 2020/0292040 A1 Sep. 17, 2020

Related U.S. Application Data

(62) Division of application No. 16/135,023, filed on Sep. 19, 2018, now Pat. No. 10,718,414.
(Continued)

(51) Int. Cl.
*B60K 6/365* (2007.10)
*F16H 37/08* (2006.01)
(Continued)

(52) U.S. Cl.
CPC ............ *B60K 6/365* (2013.01); *B60K 1/00* (2013.01); *B60K 6/48* (2013.01); *B60K 6/547* (2013.01); *B60K 7/0007* (2013.01); *F16H 1/28* (2013.01); *F16H 1/46* (2013.01); *F16H 7/02* (2013.01); *F16H 7/06* (2013.01); *F16H 37/082* (2013.01); *F16H 48/08* (2013.01); *F16H 48/10* (2013.01); *B60K 2001/001* (2013.01); *B60K 2006/4808* (2013.01); *B60K 2006/4825* (2013.01);
(Continued)

(58) Field of Classification Search
CPC ...... B60K 2001/001; B60K 2007/0092; B60K 6/365; B60K 6/48; B60K 2006/4808; B60K 2006/4825
See application file for complete search history.

(56) References Cited

U.S. PATENT DOCUMENTS 6,401,850 B1 * 6/2002 Bowen .................. B60K 6/48
180/65.6
8,292,769 B2 10/2012 Lawson, Jr.
(Continued)

FOREIGN PATENT DOCUMENTS

CN 106608178 A 5/2017

*Primary Examiner* — Erin D Bishop
(74) *Attorney, Agent, or Firm* — Kevin L. Parks

(57) ABSTRACT

A vehicle differential includes a planetary gear set, a housing, at least one spider gear, an electric motor, and a first axle shaft. The planetary gear set includes a ring gear, a sun gear, and a planet carrier with a plurality of planets. The housing is fixed to the planet carrier, the at least one spider gear is disposed in the housing, an electric motor output is fixed to the ring gear, and the first axle shaft extends from the spider gear through the electric motor. In an example embodiment, the differential includes a shaft extending through the housing orthogonal to the first axle shaft. The at least one spider gear is four spider gears, a first pair of spider gears is arranged on the shaft, and a third spider gear is drivingly engaged with the first pair of spider gears and the first axle shaft.

9 Claims, 4 Drawing Sheets

Related U.S. Application Data

(60) Provisional application No. 62/560,511, filed on Sep. 19, 2017.

(51) Int. Cl.

| | | |
|---|---|---|
| *F16H 1/28* | (2006.01) | |
| *F16H 7/02* | (2006.01) | |
| *F16H 7/06* | (2006.01) | |
| *F16H 48/08* | (2006.01) | |
| *B60K 6/547* | (2007.10) | |
| *B60K 6/48* | (2007.10) | |
| *B60K 1/00* | (2006.01) | |
| *B60K 7/00* | (2006.01) | |
| *F16H 1/46* | (2006.01) | |
| *F16H 48/10* | (2012.01) | |
| *F16H 3/66* | (2006.01) | |

(52) U.S. Cl.
 CPC ............... *B60K 2007/0038* (2013.01); *B60K 2007/0092* (2013.01); *F16H 3/66* (2013.01)

(56) References Cited

U.S. PATENT DOCUMENTS

| | | | |
|---|---|---|---|
| 8,992,366 B2 * | 3/2015 | Gassmann | ............... B60K 1/00 475/150 |
| 9,022,890 B2 | 5/2015 | Smetana et al. | |
| 9,222,565 B2 | 12/2015 | Pichler et al. | |
| 9,593,754 B2 | 3/2017 | Sten | |
| 9,689,485 B1 | 6/2017 | Zhao et al. | |
| 2005/0272547 A1 | 12/2005 | House | |
| 2014/0113760 A1 | 4/2014 | Diemer et al. | |

\* cited by examiner

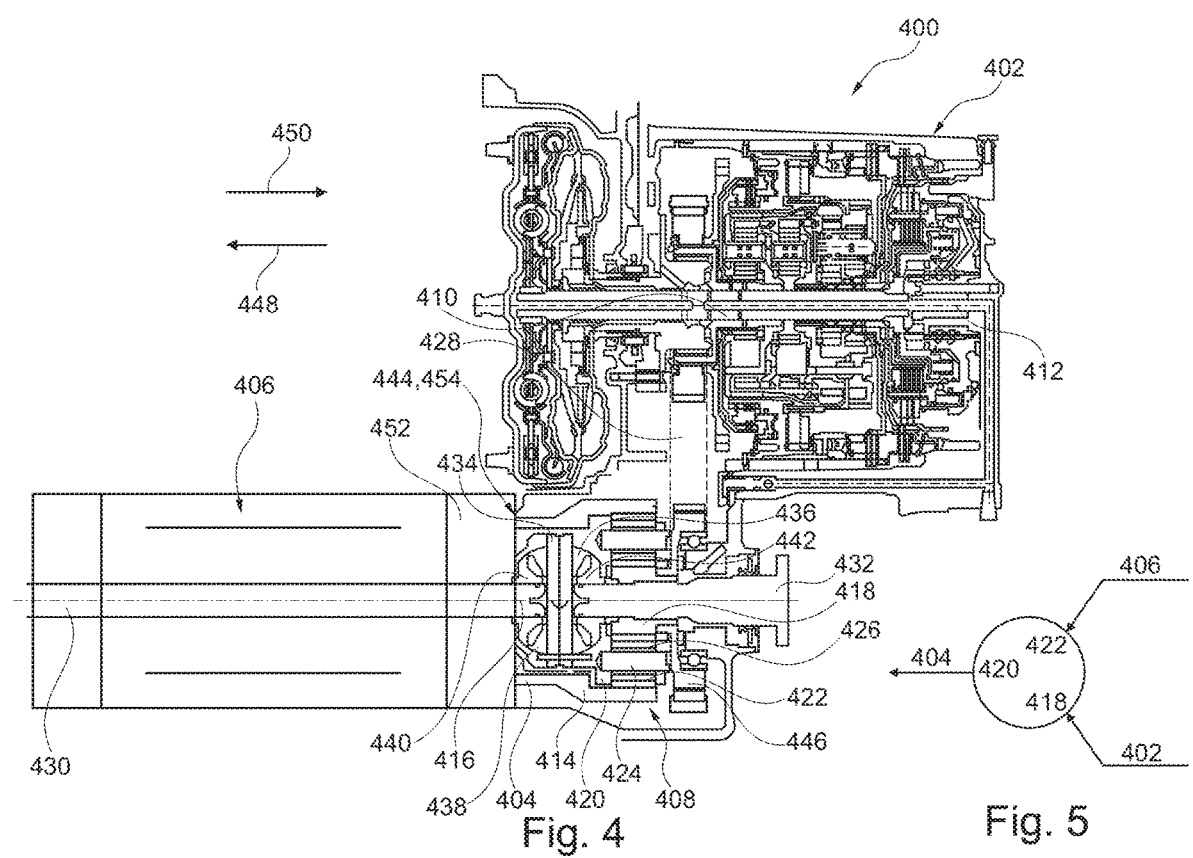

FRONT-WHEEL DRIVE HYBRIDIZATION

FIELD

The invention relates generally to a hybrid device, and more specifically to front-wheel drive hybridization.

BACKGROUND

Hybrid devices are known. One example is shown in commonly-assigned U.S. Pat. No. 9,022,890 titled TRANSMISSION DEVICE, FOR EXAMPLE FOR AN ELECTRIC AXLE AND ELECTRIC AXLE COMPRISING THE TRANSMISSION DEVICE, to Smetana et al., hereby incorporated by reference as if set forth fully herein.

BRIEF SUMMARY

Example aspects broadly comprise a hybrid transmission for a front-wheel drive vehicle including a multi-speed transmission, a differential, an electric motor, and a planetary gear set. The multi-speed transmission includes an input shaft with a first axis. The differential includes a housing with a second axis, radially offset from the first axis. The electric motor is concentric with the second axis. The planetary gear set connects the multi-speed transmission, the differential, and the electric motor. In some example embodiments, the planetary gear set includes a sun gear drivingly engaged with the multi-speed transmission, a planet carrier drivingly engaged with the differential, and a ring gear drivingly engaged with the electric motor.

In an example embodiment, the planetary gear set has a pin extending through the planet carrier, and a planet gear rotatable about the pin and drivingly engaged with the sun gear and the ring gear. In an example embodiment, the hybrid transmission has a chain or belt drivingly connecting the multi-speed transmission with the sun gear. In some example embodiments, the hybrid transmission has a first axle shaft extending from the differential through the electric motor. In an example embodiment, the hybrid transmission has a second axle shaft extending from the differential away from the electric motor.

In some example embodiments, the differential has a housing. The planetary gear set includes a sun gear drivingly engaged with the multi-speed transmission, a planet carrier drivingly engaged with the differential housing, and a ring gear drivingly engaged with the electric motor. In an example embodiment, the planetary gear set has a first pin extending through the planet carrier, and a planet gear rotatable about the first pin and drivingly engaged with the sun gear and the ring gear. In some example embodiments, the differential has a second pin extending through the housing, a first pair of spider gears rotatable about the second pin, and a second pair of spider gears drivingly engaged with the first pair of spider gears. In an example embodiment, the hybrid transmission has a first axle shaft drivingly engaged with one of the second pair of spider gears, and a second axle shaft drivingly engaged with the other of the second pair of spider gears. At least one of the first axle shaft or the second axle shaft extends through the electric motor.

Other example aspects broadly comprise a vehicle differential including a planetary gear set, a housing, at least one spider gear disposed in the housing, an electric motor, and a first axle shaft. The planetary gear set has a ring gear, a sun gear, and a planet carrier including a plurality of planets. The housing is fixed to the planet carrier. The electric motor has an output fixed to the ring gear. The first axle shaft extends from the spider gear through the electric motor. In an example embodiment, the housing is disposed axially between the planetary gear set and the electric motor.

In some example embodiments, the vehicle differential has a shaft extending through the housing orthogonal to the axle shaft. The at least one spider gear is four spider gears, a first pair of the four spider gears is arranged on the shaft, and a third one of the four spider gears is drivingly engaged with the first pair of the four spider gears and the first axle shaft. In an example embodiment, the vehicle differential has a second axle shaft. A fourth one of the four spider gears is drivingly engaged with the first pair of the four spider gears and the second axle shaft. In an example embodiment, the vehicle differential has a sprocket or a pulley arranged for transmitting a torque to the sun gear. The housing is disposed on a first axial side of the planetary gear set, and the sprocket or the pulley is disposed on a second axial side of the planetary gear set, opposite the first axial side. In an example embodiment, the electric motor has a reduction gear and an output of the reduction gear is fixed to the ring gear.

BRIEF DESCRIPTION OF THE DRAWINGS

The nature and mode of operation of the present invention will now be more fully described in the following detailed description taken with the accompanying drawing figures, in which:

FIG. 4 is a cross-section view of a hybrid transmission for a front-wheel drive vehicle, according to an example embodiment; and, FIG. 5 is a schematic view of a planetary gear set.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
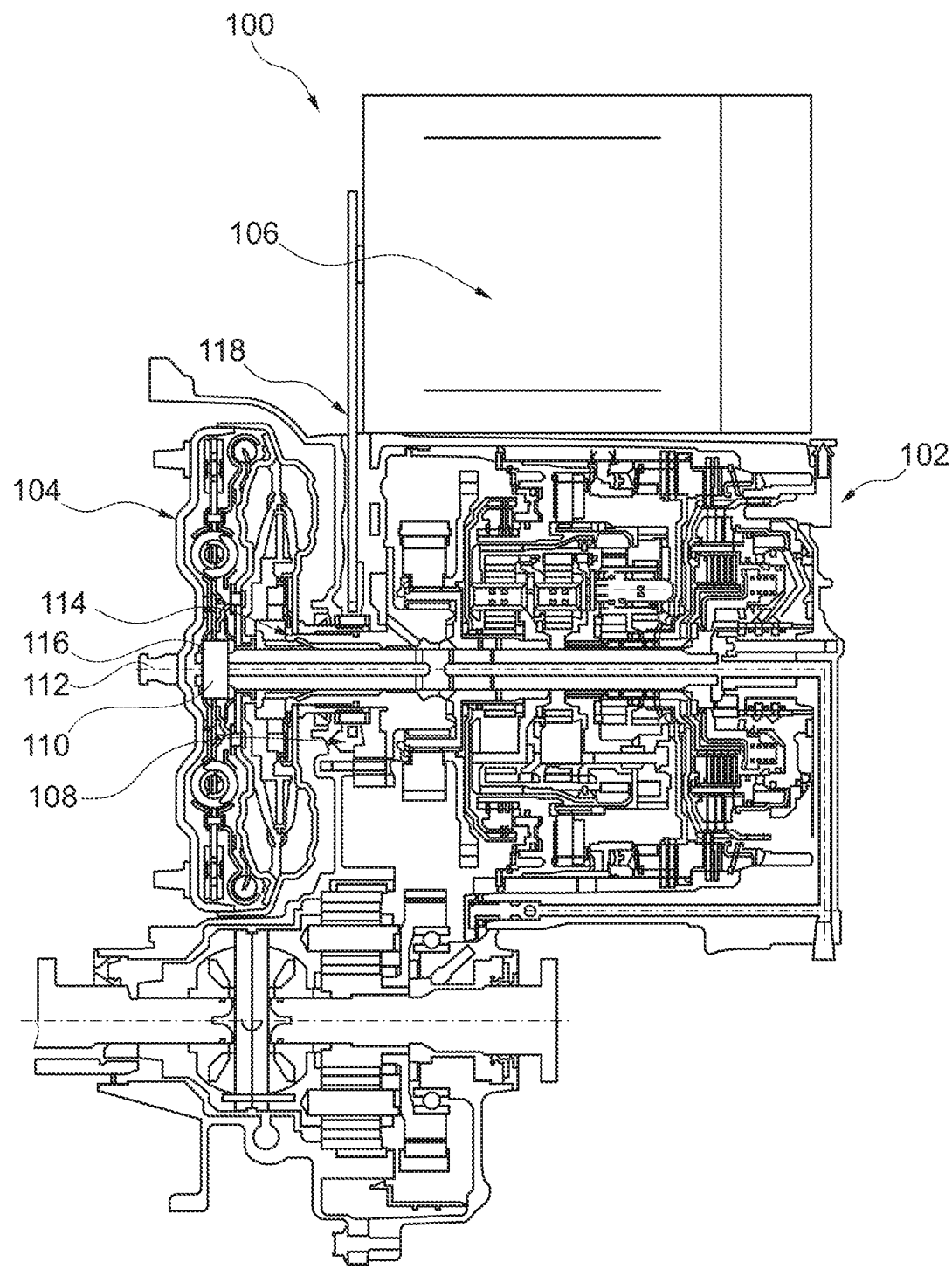
FIG. 1 is a cross-section view of a hybrid transmission for a front-wheel drive vehicle, according to an example embodiment.

The following description is made with reference to FIG. 1. FIG. 1 is a cross-section view of hybrid transmission 100 for a front-wheel drive vehicle. Hybrid transmission 100 includes multi-speed transmission 102, torque converter 104, and electric motor 106. The transmission includes transmission pump 108 and input shaft 110 with axis 112. The torque converter is coaxial with axis 112. Torque converter 104 includes pump hub, or impeller hub, 114 drivingly engaged with the transmission pump and output hub 116 drivingly engaged with the input shaft. The electric motor is radially offset from axis 112 and drivingly engaged with the pump hub. Hybrid transmission 100 includes chain, or belt, 118 drivingly connecting the transmission pump, the pump hub, and the electric motor.

Figure 2:
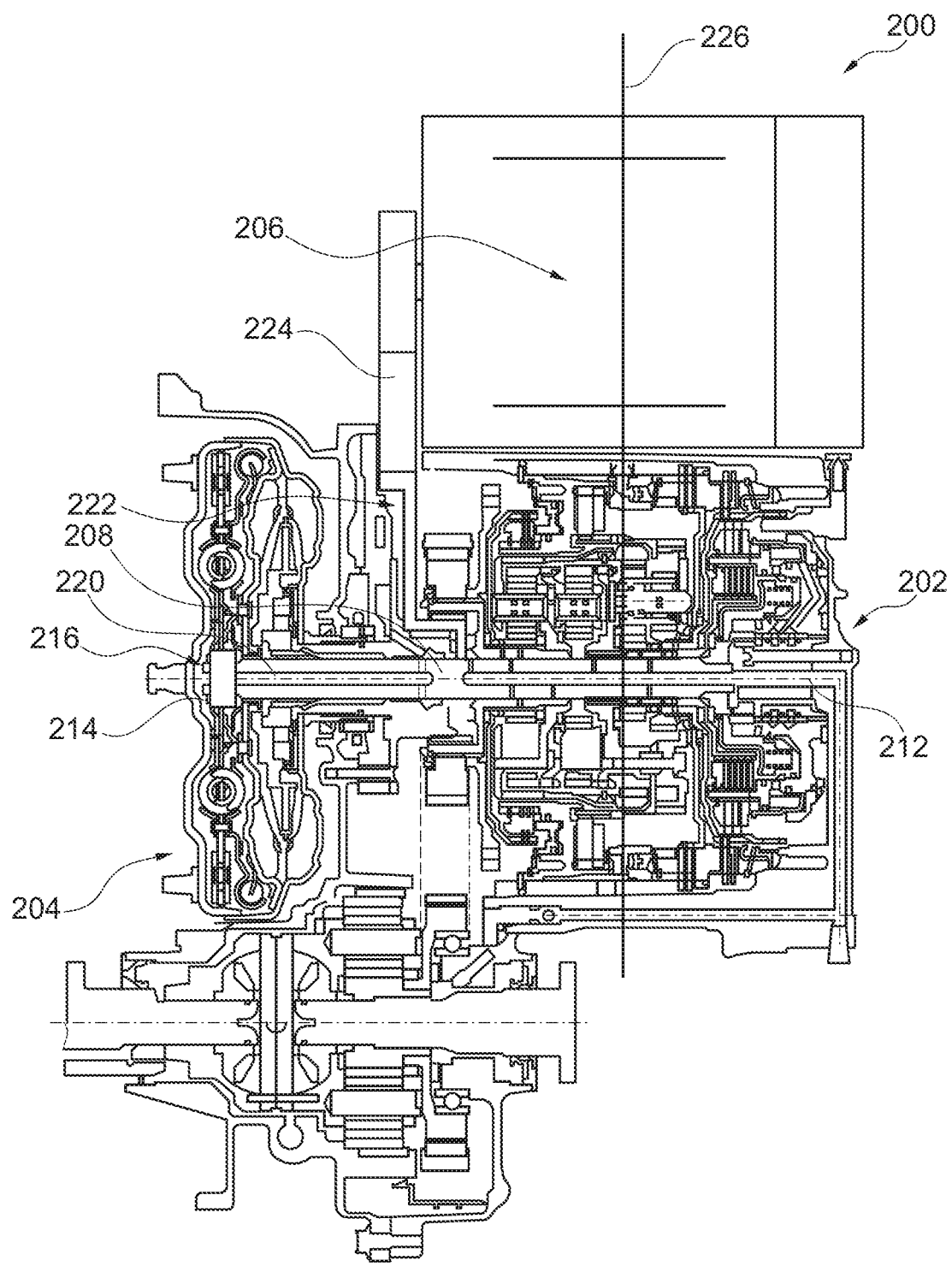
FIG. 2 is a cross-section view of a hybrid transmission for a front-wheel drive vehicle, according to an example embodiment.

The following description is made with reference to FIG. 2. FIG. 2 is a cross-section view of hybrid transmission 200 for a front-wheel drive vehicle. Hybrid transmission 200 includes multi-speed transmission 202, torque converter 204, and electric motor 206. The transmission includes input shaft 208 with axis 212. The torque converter is coaxial with axis 212. Torque converter 204 includes output hub 214 and clutch 216 connecting the output hub to the input shaft. The electric motor is radially offset from axis 212 and drivingly engaged with the input shaft.

Clutch 216 may be a dog clutch or a switchable one-way clutch, for example. Clutch 216 includes spring (not shown). The spring is arranged to close the clutch and rotatably connect the hub and the input shaft. A hydraulic pressure from the transmission opens the clutch to rotatably disconnect the hub and the input shaft. Input shaft 208 includes bore 220 and the hydraulic pressure is introduced to the clutch through the bore. Hybrid transmission 200 includes flange 222 drivingly engaged with the input shaft and the electric motor. The flange is disposed axially between the multi-speed transmission and the torque converter. Hybrid transmission 200 includes chain, or belt, 224 drivingly connecting the flange and the electric motor. Hybrid transmission 200 includes an air conditioner compressor (not shown), radially offset from axis 212 and drivingly engaged with the input shaft. The multi-speed transmission and the electric motor are at least partially radially aligned. That is, radial line 226, orthogonal to axis 212, passes through the multi-speed transmission and the electric motor.

Figure 3:
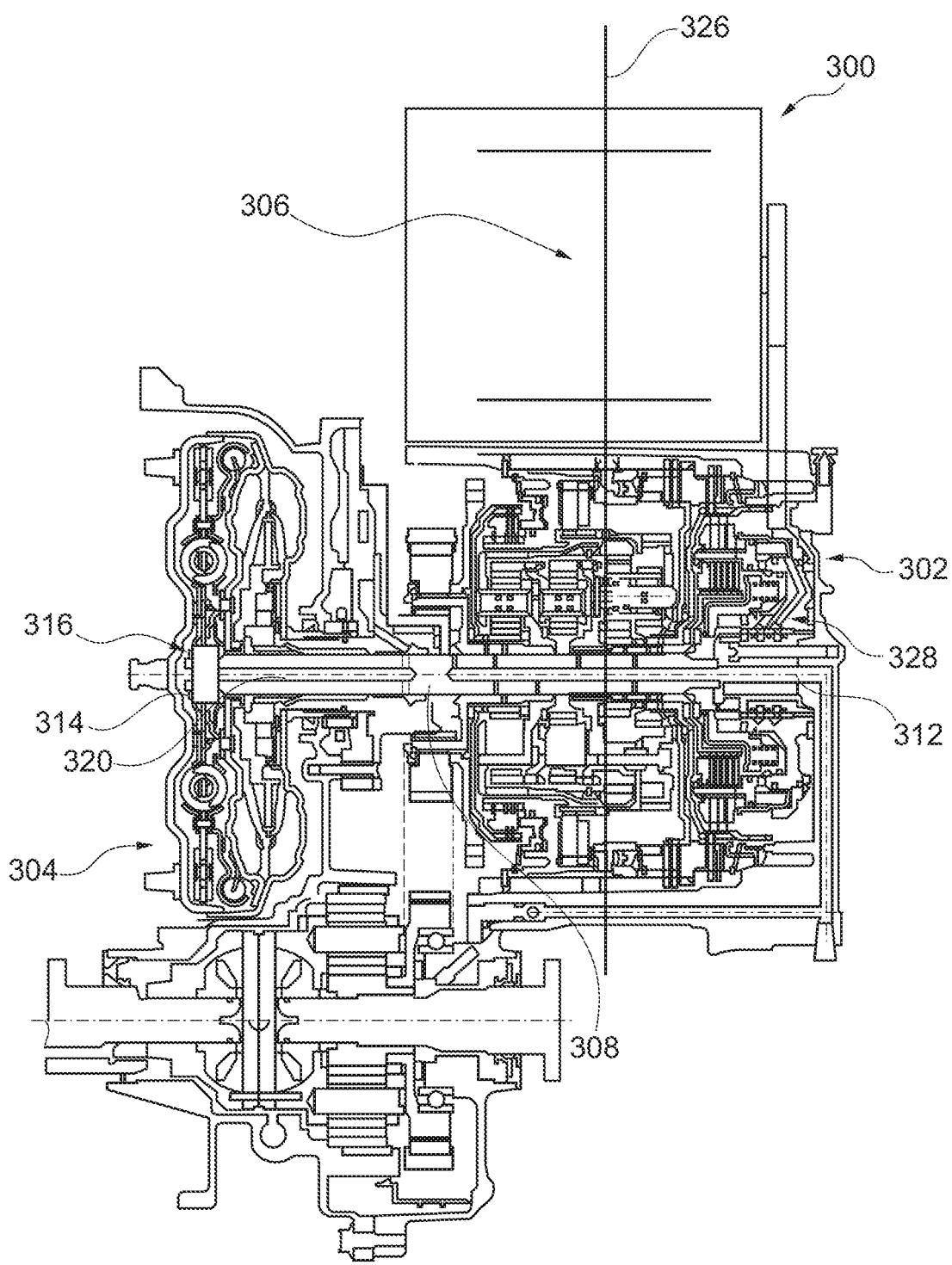
FIG. 3 is a cross-section view of a hybrid transmission for a front-wheel drive vehicle, according to an example embodiment.

The following description is made with reference to FIG. 3. FIG. 3 is a cross-section view of hybrid transmission 300 for a front-wheel drive vehicle. 3XX labels generally correspond to 2XX labels for the description of hybrid transmission 200 above, except where noted below. Multi-speed transmission 302 includes clutch hub 328 drivingly engaged with the input shaft and the electric motor. Torque converter 304 is disposed on a first axial end of the multi-speed transmission and clutch hub 328 is disposed on a second axial end, opposite the first axial end, of the multi-speed transmission. Hybrid transmission 300 includes chain, or belt, 330 drivingly connecting the clutch hub and the electric motor.

The following description is made with reference to FIGS. 4-5. FIG. 4 is a cross-section view of hybrid transmission 400 for a front-wheel drive vehicle. FIG. 5 is a schematic view of planetary gear set 408 of hybrid transmission 400. Hybrid transmission 400 for a front-wheel drive vehicle includes multi-speed transmission 402, differential 404, electric motor 406, and planetary gear set 408. The multi-speed transmission includes input shaft 410 with axis 412. The differential includes housing 414 with axis 416, radially offset from axis 412. The electric motor is concentric with axis 416. The planetary gear set connects the multi-speed transmission, the differential, and the electric motor as described in more detail below.

The planetary gear set includes sun gear 418 drivingly engaged with the multi-speed transmission, planet carrier 420 drivingly engaged with the differential, and ring gear 422 drivingly engaged with the electric motor. The planetary gear set also includes pin 424 extending through the planet carrier and planet gear 426 rotatable about pin 424 and drivingly engaged with the sun gear and the ring gear. Chain 428 drivingly connects the multi-speed transmission with the sun gear. Although a chain is shown, other embodiments are possible. For example, a belt, multi-ribbed belt, cogged belt, or the like could also be used in place of chain 428.

Hybrid transmission 400 includes axle shaft 430 extending from the differential through the electric motor, and axle shaft 432 extending from the differential away from the electric motor. Differential 404 includes pin 434 extending through the housing, spider gears 436 and 438 rotatable about pin 434, and spider gears 440 and 442 drivingly engaged with spider gears 436 and 438. Axle shaft 430 is drivingly engaged with spider gear 440 and axle shaft 432 is drivingly engaged with spider gear 442. As noted above, axle shaft 432 extends through the electric motor.

Vehicle differential 404 includes planetary gear set 408, housing 414, spider gear 436, electric motor 406, and axle shaft 430. The planetary gear set includes ring gear 422, sun gear 418, and planet carrier 420 with planet gears, or planets, 426. Housing 414 is fixed to the planet carrier. Spider gear 440 is disposed in the housing. Electric motor 406 has output 444 fixed to ring gear. Axle shaft 430 extends from the spider gear through the electric motor. The housing is disposed axially between the planetary gear set and the electric motor. Shaft, or pin, 434 extends through the housing orthogonal to the axle shaft. Spider gears 436 and 438 are arranged on shaft 434. Spider gear 444 is drivingly engaged with the spider gears 436 and 438, and axle shaft 430. Differential 404 includes axle shaft 432. Spider gear 442 is drivingly engaged with spider gears 436 and 438, and axle shaft 432.

Differential 404 includes sprocket, or pulley, 446 arranged for transmitting a torque to the sun gear. Housing 414 is disposed on axial side 448 of the planetary gear set. The sprocket, or pulley, is disposed on axial side 450 of the planetary gear set, opposite axial side 448. Electric motor 406 includes reduction gear 452 and output 454 of the reduction gear is fixed to the ring gear.

Although multi-speed planetary transmissions are shown, other transmissions are possible. For example, layshaft transmissions, continuously variable transmission, epicyclic transmissions, dedicated hybrid transmissions, double-clutch transmissions, automated manual transmission, or other types of transmissions may be used and should be considered within the scope of the invention.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LIST OF REFERENCE NUMERALS

100 Hybrid transmission
102 Multi-speed transmission
104 Torque converter
106 Electric motor
108 Transmission pump
110 Input shaft
112 Axis
114 Pump hub (impeller hub)
116 Output hub 118 Chain (or belt)
200 Hybrid transmission
202 Multi-speed transmission
204 Torque converter
206 Electric motor
208 Input shaft
212 Axis
214 Output hub
216 Clutch
220 Bore
222 Flange
224 Chain (or belt)
226 Radial line
300 Hybrid transmission
302 Multi-speed transmission
304 Torque converter
306 Electric motor
314 Output hub
316 Clutch
320 Bore
326 Radial line
328 Clutch hub
330 Chain (or belt)
400 Hybrid transmission
402 Multi-speed transmission
404 Differential
406 Electric motor
408 Planetary gear set
410 Input shaft
412 Axis (first)
414 Housing
416 Axis (second)
418 Sun gear
420 Planet carrier
422 Ring gear
424 Pin (first, planet carrier)
426 Planet gear
428 Chain
430 Axle shaft (first)
432 Axle shaft (second)
434 Pin (second, differential)
436 Spider gear (first pair)
438 Spider gear (first pair)
440 Spider gear (second pair)
442 Spider gear (second pair)
444 Electric motor output
446 Sprocket (or pulley)
448 Axial side (first)
450 Axial side (second)
452 Reduction gear
454 Output (reduction gear)

What we claim is:

1. A vehicle differential comprising:
a planetary gear set comprising a ring gear, a sun gear, and a planet carrier including a plurality of planets;
a housing fixed to the planet carrier;
at least one spider gear disposed in the housing;
an electric motor with an output fixed to the ring gear; and,
a first axle shaft extending from the spider gear through the electric motor, wherein the housing is disposed axially between the planetary gear set and the electric motor.

2. The vehicle differential of claim 1 further comprising a shaft extending through the housing orthogonal to the first axle shaft, wherein:
the at least one spider gear is one of four spider gears;
a first pair of the four spider gears is arranged on the shaft; and,
a third one of the four spider gears is drivingly engaged with the first pair of the four spider gears and the first axle shaft.

3. The vehicle differential of claim 2 further comprising a second axle shaft, wherein a fourth one of the four spider gears is drivingly engaged with the first pair of the four spider gears and the second axle shaft.

4. The vehicle differential of claim 1 further comprising a sprocket or a pulley arranged for transmitting a torque to the sun gear, wherein:
the housing is disposed on a first axial side of the planetary gear set; and,
the sprocket or the pulley is disposed on a second axial side of the planetary gear set, opposite the first axial side.

5. The vehicle differential of claim 1 wherein the electric motor comprises a reduction gear with a reduction gear output and the reduction gear output is the output.

6. A vehicle differential comprising:
a planetary gear set comprising a ring gear, a sun gear, and a planet carrier including a plurality of planets;
a housing fixed to the planet carrier;
at least one spider gear disposed in the housing;
an electric motor with an output fixed to the ring gear;
a first axle shaft extending from the spider gear through the electric motor; and
a sprocket or a pulley arranged for transmitting a torque to the sun gear, wherein:
the housing is disposed on a first axial side of the planetary gear set; and,
the sprocket or the pulley is disposed on a second axial side of the planetary gear set, opposite the first axial side.

7. The vehicle differential of claim 6 further comprising a shaft extending through the housing orthogonal to the first axle shaft, wherein:
the at least one spider gear is one of four spider gears;
a first pair of the four spider gears is arranged on the shaft; and,
a third one of the four spider gears is drivingly engaged with the first pair of the four spider gears and the first axle shaft.

8. The vehicle differential of claim 7 further comprising a second axle shaft, wherein a fourth one of the four spider gears is drivingly engaged with the first pair of the four spider gears and the second axle shaft.

9. The vehicle differential of claim 6 wherein the electric motor comprises a reduction gear with a reduction gear output and the reduction gear output is the output.

\* \* \* \* \*